United States Patent
Komolrochanaporn

(10) Patent No.: US 6,186,558 B1
(45) Date of Patent: Feb. 13, 2001

(54) PIPE FITTING

(76) Inventor: Naris Komolrochanaporn, 119 Soi Wat suthavas, Bukkkalo, Dhonburi Bangkok (TH)

( * ) Notice: Under 35 U.S.C. 154(b), the term of this patent shall be extended for 0 days.

(21) Appl. No.: 09/346,129

(22) Filed: Jul. 9, 1999

(51) Int. Cl.$^7$ .................................................. F16L 55/00
(52) U.S. Cl. .................... 285/148.19; 285/355; 285/390; 285/423
(58) Field of Search ................ 285/148.19, 148.6, 285/148.7, 355, 390, 423

(56) References Cited

U.S. PATENT DOCUMENTS

| | | | |
|---|---|---|---|
| 3,614,137 | * 10/1971 | Jacobson | 285/390 |
| 4,093,280 | * 6/1978 | Yoshizawa et al. | 285/390 X |
| 4,179,142 | * 12/1979 | Schopp | 285/390 X |
| 4,682,797 | * 7/1987 | Hildner | 285/355 X |
| 5,215,341 | * 6/1993 | Namakura et al. | 285/423 |
| 5,350,202 | * 9/1994 | Fritz et al. | 285/423 X |

* cited by examiner

Primary Examiner—Neill Wilson
(74) Attorney, Agent, or Firm—Jack C. Munro

(57) ABSTRACT

A pipe fitting in the form of a male coupler and a female coupler both of which have imbedded therein a threaded metallic insert. Both the male coupler and female coupler have a metallic insert that is constructed to define a treacherous path at the surface boundary of the metal insert so as to minimize the possibility of any leakage exteriorly of the coupler from a liquid conducting bore passing through each of the couplers.

14 Claims, 2 Drawing Sheets

PIPE FITTING

BACKGROUND OF THE INVENTION

1) Field of the Invention

The field of this invention relates to pipe fittings and more particularly to an interconnecting male coupler and female coupler which are to be connected together in a liquid tight manner between a pair of pipe sections which are slightly axially spaced apart.

2) Description of the Prior Art

The use of pipe fittings for connecting together a pair of axially spaced apart pipe sections has long been known. In the laying of any liquid conducting pipe, generally the pipe sections come in prescribed lengths, such as twenty feet in length or any other custom required length. When laying of a length of pipe greater or lesser than standard available length, there is therefore required pipe fittings to connect together the joined pipe sections in a liquid tight manner. Normally, for reasons of economics, plastic pipe is being used with greater frequency as opposed to metallic pipe. Plastic pipe has the advantage that it does not rust as does metallic pipe. However, plastic pipe also has the disadvantage in that it is not as strong as metallic pipe and especially in the area of the fittings that interconnect the different sections of pipe, it is difficult to apply a sufficient amount of compressive force in connecting together of the couplers of the fitting in order to achieve a long lasting liquid tight connection.

In the past, in order to design a stronger plastic fitting or coupling, it has been common to incorporate one or more metallic members within the fitting that are to be used to establish a high degree of compression in forming of the fitting. Plastic fittings alone have been proved incapable of being torqued sufficiently to produce a leak proof fitting for a long period of time owing to its lesser strength compared to metals. Even after the incorporation of the metallic member, the fundamental problem of a liquid leak proof joint remained to be solved due to the formation of a gap at the surface of metal and plastic interface due to inherent property of plastic to shrink after injection molding. Sometimes this gap formation also occurs during over tightening of the fitting resulting in exterior leaks over a period of time. Inserting bigger sizes of metallic inserts and threading the entire length of metallic inserts, exteriorly or interiorly also adds to the cost which is finally to be borne by end users. Some of these prior art types of fittings require the use of several different parts which requires an assembly procedure of the fitting prior to interconnecting of the male coupler and female coupler of the fitting.

If the fitting is constructed totally of plastic, it has been discovered that a totally plastic male coupler and female coupler, when engaged, cannot be tightened sufficiently due to their inherent lesser compression strength than metal fittings to establish sufficient compression that will produce a long lasting liquid tight relationship between a pair of pipe sections.

SUMMARY OF THE INVENTION

The injection molding of a female coupler and a male coupler with each coupler being imbedded with a metallic insert. Each metallic insert includes a series of threads with these threads to be located at the position to be first engaged when interconnecting the male coupler and the female coupler. The first series of threads in any series of threads are the threads that are subjected to possible damage during engagement and also are subject to damage by an exterior object prior to engagement. Therefore, if these threads could be constructed of metal rather than plastic, the resulting pipe fitting is substantially improved because metal threads are stronger than plastic threads and therefore are damaged less. Each of the metallic inserts establish a boundary or interface with the plastic with this boundary communicating with a fluid conducting bore through the fitting. Inherently, this boundary is subjected to liquid being conducted along the boundary and eventually exiting at an exterior surface of the fitting. In order to minimize this possibility of leakage along this boundary, the metal insert is constructed to include at least one notch, protrusion and groove so as to provide a treacherous path for the leakage thereby minimizing the possibility of leakage. The notch, groove and protrusion also function to provide a tight interconnection between the plastic and the metal to keep the plastic bound tight against the metal. Inherently, after the injection molding process, there is a natural tendency for plastic to shrink and therefore produce a minute gap in the contact area between the plastic and the metal insert. The notch, protrusion and groove facilitate tight interconnection between the plastic surface and the metal surface to minimize the creation of any gap.

One of the primary objectives of the present invention is to create a pipe fitting which produces a leak-proof connection between the male coupler and the female coupler of the pipe fitting.

Another objective of the present invention is to construct a pipe fitting which is constructed mainly of plastic that utilizes imbedded metal inserts which are positioned at locations of high degree of wear so as to produce not only a long lasting leak-proof pipe fitting but also a pipe fitting to which a greater than normal degree of compression can be applied than if the pipe fitting were constructed solely of plastic.

Another objective of the present invention is to construct a pipe fitting which can be manufactured at a cost relatively less expensive than conventional metallic pipe fittings and thereby sold to the ultimate consumer at a relatively inexpensive cost.

DETAILED DESCRIPTION OF THE PREFERRED EMBODIMENT

Figure 1:
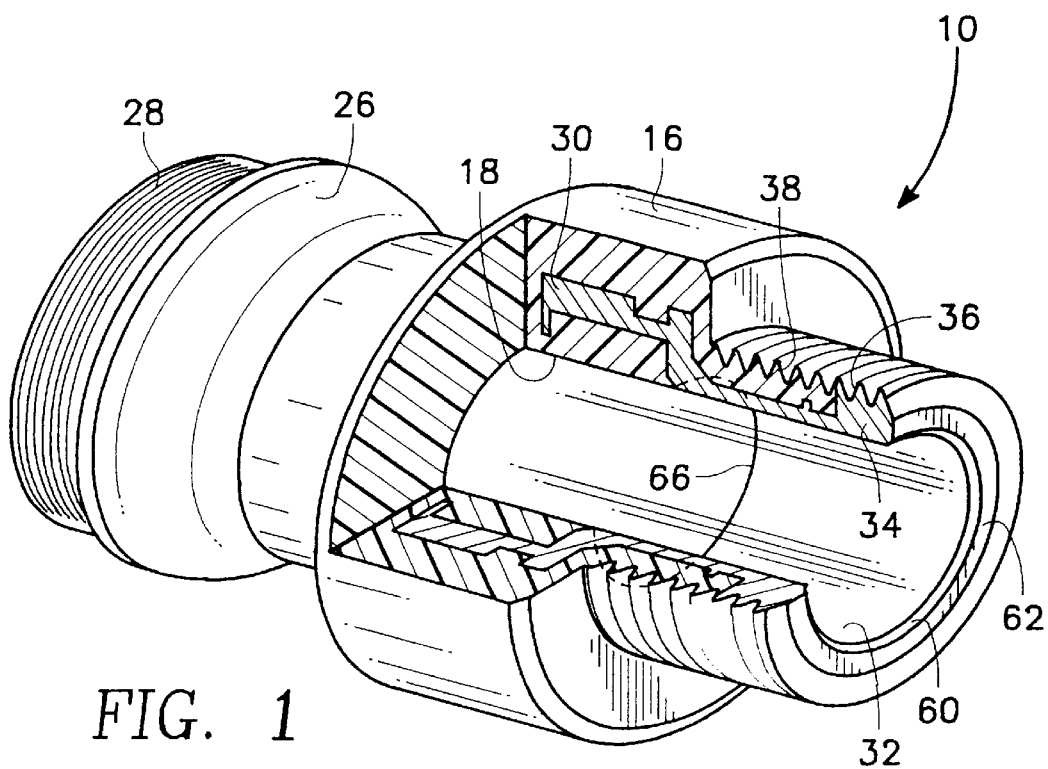
FIG. 1 is an isometric view, partly in cross-section, of the male coupler utilized in conjunction with the pipe fitting of the present invention.

Referring particularly to the drawings, there is shown in FIG. 1 the male coupling 10 of the pipe fitting 12 of the present invention. The pipe fitting 12 is shown in FIG. 3. The pipe fitting 12 also includes a female coupling 14 which is also shown in the isometric view in FIG. 2.

The male coupling 10 has an annular shaped plastic body 16 with a through bore 18 being centrally formed through the plastic body 16. The through bore 18 includes an enlarged rear section 20 which forms an annular flange 22 in its connection with the through bore 18. A pipe section 24 is to be inserted within the enlarged rear section 20 with the forward end of the pipe section 24 to abut against the annular flange 22. The pipe section 24 is to be fixedly secured to connector 26 which is integral with the body 16. The threads 28 formed on the exterior surface of the connector 26 are to be used to be connectable to a separate connector fitting, which is not shown, which will function to secure the pipe section 24 to the connector 26. It is to be understood that the pipe section 24 will be plastic.

The male coupling 10 is to be formed by the injection molding process. A metal insert 30 is imbedded within the plastic body 16 with the metal insert 30 actually inserted within the injection molding machine prior to the injection molding of the plastic body 16. The metal insert 30 has a through bore 32 which is to be aligned with the through bore 18 and also to be of the same diameter as the bore 18. The metal insert 30 includes a forward threaded end 34 which includes a short series (approximately three in number) of external threads 36. The plastic body 16 also includes a series (approximately six in number) of external threads 38. The threads 38 are in alignment with the threads 36 and there is actually a joint 40 formed between the plastic thread on the plastic body 16 and the metal thread on the metal insert 30 at the external of a boundary 42 which comprises the interface between the plastic body 16 and the metal insert 30 with it being understood that this boundary 42 is imbedded within the plastic body 16. The boundary 42 forms an annular joint 66 that connects with the through bore that is formed by through bores 18 and 32. The portion of the plastic body 16 that contains the threads 38 is mounted above an enlarged annular portion 44 of the metal insert 30. From the annular portion 44, the metal insert 30 forms a plateau section 46 within which is formed an annular groove 48. The metal insert 30 terminates at an end 50 which extends at a right angle from the plateau section 46. The end 50 includes a thin annular protrusion 52 which helps to define an inner annular groove 54. The inner annular groove 54 terminates at an annular ledge 56 which has a chamfered edge 58 which then connects to the enlarged annular portion 44 which forms inside surface of the metal insert 30 that defines the internal through bore 32. This inside surface of the internal through bore 32 terminates in a chamfered edge 60 which then connects to the outer end 62 of the metal insert 30. The enlarged annular portion 44 includes an annular notch 64. This annular notch 64 is located in close proximity to the joint 40. One of the purposes of the annular notch 64 is to attempt to keep the plastic body 16 into tight connection with the metal insert 30 at the joint 40. There is a tendency for plastic 16 to slightly shrink after the injection molding process. One of the functions of the notch 64 is to keep the plastic body in tight contact with the metal insert 30 hoping to eliminate or make minimal gap if any at the joint 40.

It is to be understood that liquid is to be conducted through the internal passage 68 of the pipe section 24 and through the through bores 18 and 32. This means that the liquid will come into contact with the joint 66 and possibly, owing to the inherent tendency for the liquid to creep along the boundary, if given enough time, the liquid can eventually be conducted past the chamfered edge 58, past annular ledge 56, through the inner annular groove 54, past the annular protrusion 52, across the plateau section 46, through annular groove 48, across annular ridge 70 to the enlarged annular groove 44 and possibly across the annular notch 64 to the joint 40. It is deemed to be exceedingly unlikely that any liquid will eventually end up at joint 40. But even if it does, the joint 40 will be under compression as the joint 40 is between the threads 36 and 38 and will be secured to an appropriate threaded area of the female coupling 14 and therefore under compression. Normally, there would be a pipe thread tape that will be wound continuously around the threads 36 and 38 in forming the connection with the female coupling 14 which further aids in eliminating the possibility of any leakage from the joint 40.

It can thus be seen that the overall path of any leakage of liquid from joint 66 to joint 40 comprises an exceedingly treacherous path formed by the numerous contortions of the series of notches and grooves on the metal insert 30. Additionally, it is to be noted that the threads 36 are located outside of the threads 38. It is the threads 36 that are initially engaged with the threads 38 then being subsequently engaged. The threads 36 are subject to a greater amount of wear than the threads 38. Also, prior to engagement of the male coupling 10, it is the threads 36 that are most likely to incur damage by an exterior structure. The fact that the threads 36 are metal, and therefore are of a harder material than the threads 38, the threads 36 are therefore least likely to be damaged.

Figure 2:
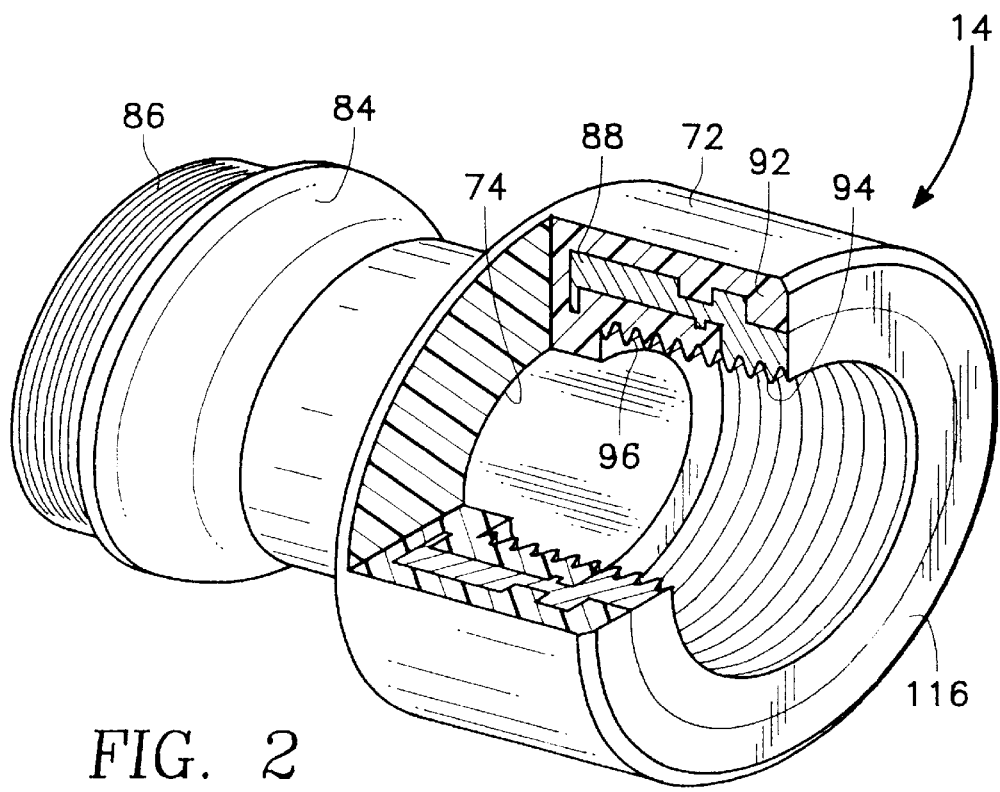
FIG. 2 is an isometric view, partly in cross-section, of the female coupler utilized in conjunction with the pipe fitting of the present invention.
Figure 3:
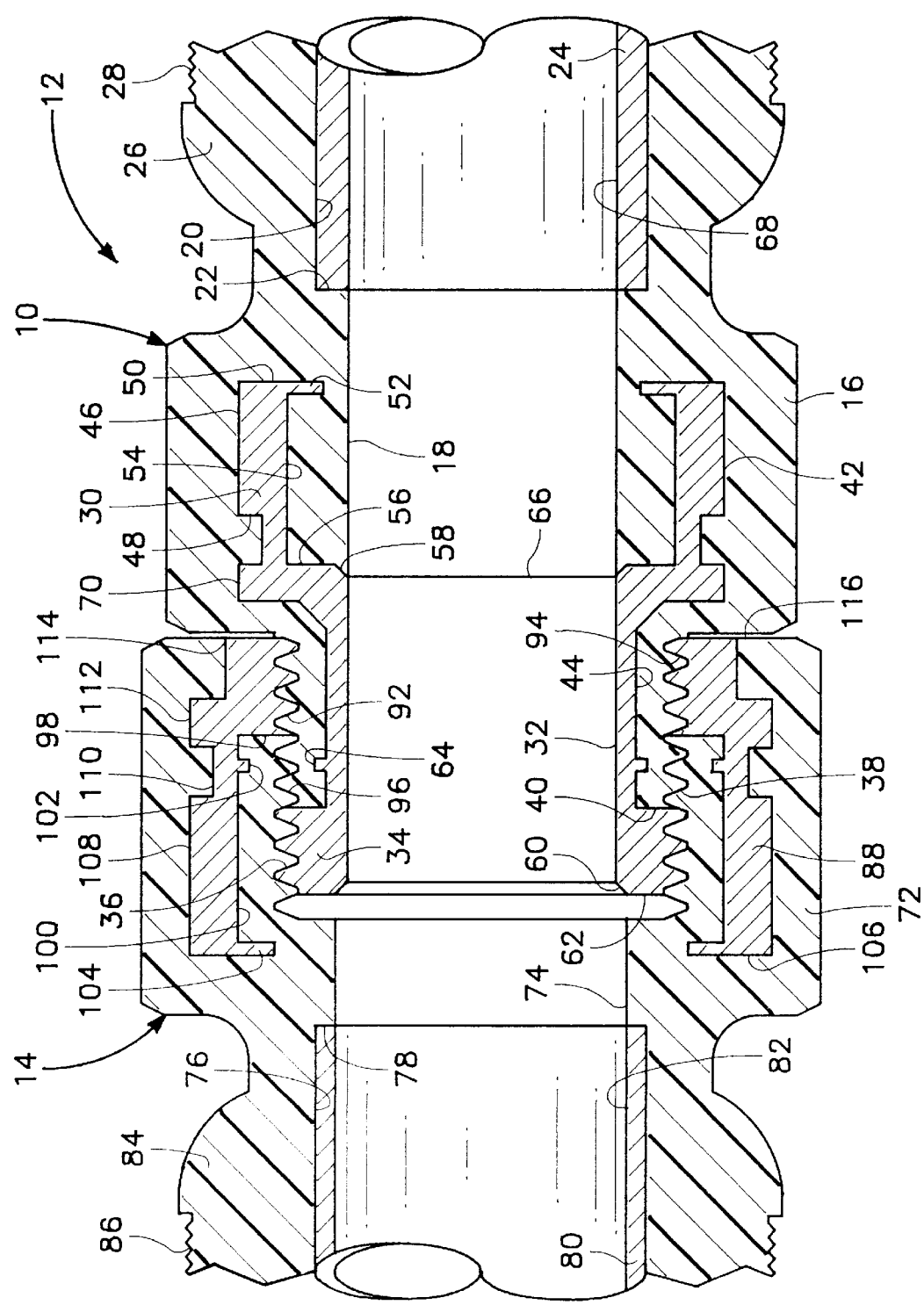
FIG. 3 is longitudinal cross-sectional view through an interconnected male coupler and female coupler of the pipe fitting of the present invention.

Referring particularly to FIGS. 2 and 3 of the drawings, the female coupling 14 includes a plastic body 72 which has a through bore 74. The through bore 74 has an enlarged rear section 76. Between the rear section 76 and the through bore 74 is an annular flange 78. A pipe section 80 is to be mounted within the rear section 76 with the forward end of the pipe section 80 abutting against the annular flange 78. The pipe section 80 has an internal passage 82 through which liquid is to flow. Liquid is to flow between the internal passage 82, the internal through bore 32, the through bore 18, and into the internal passage 68. The rear section 76 is formed within the plastic body of a connector 84 which is integral with the plastic body 72. The threads 86 are to be usable in a manner similar to the usage of the threads 28 in order to securely fix in position the pipe section 80 in conjunction with the connector 84 in a liquid-tight manner.

Imbedded within the plastic body 72 is a metal insert 88. Metal insert 88 has a forward threaded end 92 which has a series (approximately three in number) of internal threads 94. The plastic body 72 also includes a series of internal threads 96. The metal insert 88 has a boundary or interface in conjunction with the plastic body 72 which forms a joint 98 between the threads 94 and 96. From the joint 98, the interface is formed into an extended annular portion 100 within which is located an annular notch 102. The extended annular portion 100 then terminates at a thin annular protrusion 104 of an end 106. The end 106 is then formed into a plateau section 108 which located at a right angle to the end 106. Within the plateau section 108 is an annular groove 110. The annular groove 110 connects with an annular ridge 112. The annular ridge 112 then connects with forward threaded 92 forming a joint 114 at the forward end 116 of the female coupling 14.

One of the functions of the notch 102 is that after the injection molding process, shrinking tends to occur of the plastic body 72. The presence of the notch 102 in close proximity to joint 98 will hopefully keep the joint 98 tight. Actually, the annular groove 110, notch 102 and annular ridge 112 is to increase the grip between the plastic body 72 and metal insert 88 and to prevent any gap due to shrinkage of plastic after injection molding. Groove 110 provides additional space where the plastic can flow during injection molding thereby providing extra bonding between plastic and metal causing increased overall strength of the female coupler 14. This extra bonding will also prevent the slippage between plastic body 72 and inserted metal insert 88 during tightening of the fitting 12. Annular groove 48, annular notch 64 and annular ridge 70 provided on metal insert 30 has two purposes: first to make the leakage path longer and second to increase the grip between and plastic body and metal insert. Any liquid passing through the bores 82, 74, 32, 18 and 68 in either direction is unlikely to come in contact with joint 98 as female threads of female coupling will be covered by male threads of male coupling and will be under compression. Since the liquid film cannot enter at joint 98, there is no possibility for creeping of liquid film past notch 102, through extended annular portion 100, across annular extension 104, past plateau 108 and finally through the joint 114 to be disposed of in the ambient exteriorly of forward end 116.

It is again to be noted that the forward threaded end 92 comprises the first series of threads that are to be engaged relative to the female coupler 14. Again, the threads of the forward threaded end 92 are the threads that are most likely to be damaged prior to engagement. Also, when the male coupler 10 is engaged with the female coupler 14, the compressive force is divided between forward threaded ends 34 and 92 of male coupler 10 and female coupler 14 respectively.

Referring particularly to FIG. 3 of the drawings, it can be readily observed that the connection of the female coupler 14 and the male coupler 10 is to produce the pipe fitting 12 of this invention. Part of the external threads 38 lockingly engage with internal threads 94 and external threads 36 lockingly engage with part of the internal threads 96.

What is claimed is:

1. A pipe fitting for interconnecting a first pipe section which is slightly axially spaced apart from a second pipe section, a male coupling comprising:

a male coupler constructed principally of plastic having a first series of external threads;

a first connector integrally joined to said male coupler, a first through bore being internally formed within said male coupler and said first connector, said first connector adapted to be attached to an end of the first pipe section; and a first metal insert imbedded within said male coupler and said first connector, said first metal insert having a second series of external threads which are of the same diameter and type as said first series of external threads, said second series of external threads being aligned with said first series of external threads, said first series of external threads and said second series of external threads being joined at a first joint which is spaced from said first through bore, said first metal insert having a second joint with said first connector with said second joint connecting with said first through bore, both said first joint and said second joint being annular, whereby any liquid passing through said first bore may tend to enter at said second joint with the leakage path then terminating at said first joint.

2. The pipe fitting as defined in claim 1 wherein:

said first metal insert including at least one first notch and a first protrusion and a first groove all imbedded within said plastic of said male coupler to provide a treacherous path for seepage of a thin liquid film from said second joint to said first joint thereby minimizing the possibility of leakage at said first joint.

3. The pipe fitting as defined in claim 1 wherein there is included a female coupling defined as follows:

a female coupler constructed principally of plastic having a first series of internal threads;

a second connector integrally joined to said female coupler, a second through bore being internally formed within said female coupler and said second connector, said second connector adapted to be attached to an end of the second pipe section; and a second metal insert imbedded within said female coupler, said second metal insert having a second series of internal threads which are of the same diameter and type as said first series of internal threads, said second series of internal threads being aligned with said first series of internal threads, said first series of internal threads and said second series of internal threads being joined at a third joint which is spaced from said second through bore, said second metal insert having a fourth joint with said second connector with said fourth joint connecting with said second through bore, extra bonding between plastic and metal insert of female coupler resulting in increase in strength of female coupler, said female coupler to be joined in a liquid tight manner with said male coupler with said first through bore being in alignment with said second through bore, whereby upon said male coupler and said female coupler being tightened together to form said pipe fitting any liquid passing through said first through bore and said second through bore is unlikely to seep into said fourth joint because said fourth joint is in tight abutting contact with said second series of external threads and hence no possibility of leakage at said third joint.

4. The pipe fitting as defined in claim 3 wherein:

said second metal insert including at least one second notch and a second protrusion and a second groove all imbedded within said plastic of said female coupler to provide a treacherous path for leakage of liquid from said fourth joint to said third joint thereby minimizing the possibility of leakage.

5. In a pipe fitting for interconnecting a first pipe section which is slightly axially spaced apart from a second pipe section, a female coupling comprising:

a female coupler constructed principally of plastic having a first series of internal threads;

a connector integrally joined to said female coupler, a through bore being integrally formed within said female coupler and said connector, said connector adapted to be attached to an end of said first pipe section; and a metal insert imbedded within said female coupler, said metal insert having a second series of internal threads which are of the same diameter and type as said first series of internal threads, said second series of internal threads being aligned with said first series of internal threads, said first series of internal threads and said second series of internal threads being joined at a first joint which connects with said through bore, said metal insert having a second joint created at the boundary between said metal insert and said female coupler with said second joint being spaced from said through bore, both said first joint and said second joint being annular, whereby a firm grip is provided between said female coupler and said metal insert further reducing gap formation due to shrinkage of plastic after injection molding of said female coupler.

6. The pipe fitting as defined in claim 5 wherein:

said second series of internal threads being located outside of said first series of internal threads so that engagement occurs by said second series of internal threads being engaged prior to said first series of internal threads.

7. In a pipe fitting for interconnecting a first pipe section which is slightly axially spaced apart from a second pipe section, a female coupling comprising:

a female coupler constructed principally of plastic having a first series of internal threads;

a connector integrally joined to said female coupler, a through bore being integrally formed within said female coupler and said connector, said connector adapted to be attached to an end of said first pipe section;

a metal insert imbedded within said female coupler, said metal insert having a second series of internal threads which are of the same diameter and type as said first series of internal threads, said second series of internal threads being aligned with said first series of internal threads, said first series of internal threads and said second series of internal threads being joined at a first joint which connects with said through bore, said metal insert having a second joint created at the boundary between said metal insert and said female coupler with said second joint being spaced from said through bore, both said first joint and said second joint being annular, whereby a firm grip is provided between said female coupler and said metal insert further reducing gap formation due to shrinkage of plastic after injection molding of said female coupler; and said metal insert includes at least one notch, one protrusion and one ridge which are imbedded within said plastic of said female coupler to provide additional space where the plastic can flow into during injection molding thereby providing extra bonding between said female coupler and said metal insert resulting in increased strength of said female coupler.

8. In constructing of a pipe fitting, a coupler having a plastic body within which is imbedded a metal insert, there being created a boundary path between said plastic body and said metal insert, said coupler having a through bore for the passage of a liquid, said boundary path terminating in an internal end and an external end, said internal end connecting with said through bore, said external end terminating on an exterior surface of said coupler, said boundary path being of a substantial contorted length created by a series of at least one notch, one ridge and one groove formed in said metal insert.

9. The pipe fitting as defined in claim 8 wherein:

said coupler having a series of plastic threads, said metal insert having a series of metal threads, said metal threads being in alignment with said plastic threads, said metal threads being located outside of said plastic threads so as to be initially engaged during engagement of both said threads.

10. The pipe fitting as defined in claim 9 wherein:

said external end of said boundary path being located at said threads.

11. The pipe fitting as defined in claim 10 wherein:

said coupler comprising a male coupler.

12. The pipe fitting as defined in claim 9 wherein:

said internal end of said boundary path being located at said threads.

13. The pipe fitting as defined in claim 12 wherein:

said coupler comprising a female coupler.

14. The pipe fitting as defined in claim 8 wherein:

said metal insert includes at least one notch and one ridge and one protrusion which are imbedded within said plastic body to provide a treacherous path for leakage of liquid from said boundary path thereby minimizing the possibility of leakage.

* * * * *